(12) United States Patent
Gopalnarayanan

(10) Patent No.: US 11,338,352 B2
(45) Date of Patent: May 24, 2022

(54) PRESSURE EXPANSION METHODS FOR HEAT EXCHANGER MANUFACTURING

(71) Applicant: Rheem Manufacturing Company, Atlanta, GA (US)

(72) Inventor: Sivakumar Gopalnarayanan, Dallas, TX (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 16/942,119

(22) Filed: Jul. 29, 2020

(65) Prior Publication Data

US 2022/0032358 A1  Feb. 3, 2022

(51) Int. Cl.
*B21D 53/08* (2006.01)
*B23P 15/26* (2006.01)
*F28F 1/32* (2006.01)

(52) U.S. Cl.
CPC ............ *B21D 53/085* (2013.01); *B23P 15/26* (2013.01); *F28F 1/32* (2013.01); *Y10T 29/4994* (2015.01); *Y10T 29/49378* (2015.01)

(58) Field of Classification Search
CPC ..... B21D 53/085; B21D 26/041; B23P 15/26; Y10T 29/49378; Y10T 29/4938
See application file for complete search history.

(56) References Cited

U.S. PATENT DOCUMENTS

| | | | | |
|---|---|---|---|---|
| 3,724,537 | A * | 4/1973 | Johnson | F28F 1/30 165/133 |
| 4,332,073 | A * | 6/1982 | Yoshida | B21C 37/154 138/140 |
| 4,727,635 | A * | 3/1988 | Krips | B23K 9/0288 29/523 |
| 4,782,571 | A * | 11/1988 | Krips | B21D 39/06 29/447 |
| 5,765,284 | A * | 6/1998 | Ali | B21D 53/085 29/727 |
| 6,128,936 | A * | 10/2000 | Yogo | B21D 26/041 72/58 |
| 6,282,934 | B1 * | 9/2001 | Bikert | B21D 26/037 72/58 |
| 6,662,447 | B2 * | 12/2003 | Kuschel | B21C 37/151 29/418 |
| 8,033,018 | B2 * | 10/2011 | Dees | B23P 15/26 29/890.047 |

(Continued)

*Primary Examiner* — Jason L Vaughan
(74) *Attorney, Agent, or Firm* — Troutman Pepper Hamilton Sanders LLP; James E. Schutz

(57) ABSTRACT

Methods for expanding a tube to create a tight fit or an interference fit with one or more fins for the manufacture of a heat exchanger are disclosed. The methods can include providing an internal pressure to the tubes in a successive pulsing manner with each pulse having a short duration. The methods can include creating a temperature differential between the bend sections of the tubes and the straight sections of the tubes such that the bend section has a lower temperature than the straight sections. The methods can include creating an external pressure differential between the bend sections of the tubes and the straight sections of the tubes such that the external pressure acting on the bend sections is greater than the external pressure acting on the straight sections.

19 Claims, 7 Drawing Sheets

(56) References Cited

U.S. PATENT DOCUMENTS

| | | | | |
|---|---|---|---|---|
| 8,281,630 B2* | 10/2012 | Mizumura | ............ | B21D 26/037 |
| | | | | 72/58 |
| 8,621,904 B2* | 1/2014 | Mizumura | ............ | B21D 26/047 |
| | | | | 72/61 |
| 10,478,885 B1* | 11/2019 | Wurmfeld | ............ | B21D 26/041 |
| 10,960,452 B2* | 3/2021 | Yuan | ........................ | C22C 21/12 |
| 2004/0040636 A1* | 3/2004 | Watanabe | .............. | B21D 37/16 |
| | | | | 148/570 |
| 2004/0079522 A1* | 4/2004 | Paulman | .................. | F28F 1/32 |
| | | | | 165/177 |
| 2011/0030932 A1* | 2/2011 | Tucker | ................ | F28D 1/05383 |
| | | | | 165/151 |
| 2012/0036718 A1* | 2/2012 | Stroup, Sr. | ............. | B21D 39/06 |
| | | | | 29/890.035 |

* cited by examiner

PRESSURE EXPANSION METHODS FOR HEAT EXCHANGER MANUFACTURING

BACKGROUND

Manufacturing heat exchangers for heating, ventilating and air conditioning (HVAC) systems often includes expanding the diameter of a tube by applying a pressurized fluid to the interior of the tube, thereby causing the exterior surface of the tube to expand into contact with the fins of a heat exchanger coil. Such processes can be performed hydraulically or pneumatically.

Challenges in such processes can include identifying and providing an optimal pressure at which the internal pressure of the tube is above the yield point or yield threshold of the tube material—thereby causing the material to become plastic and change shape (e.g., expand)—but below the failure point or failure threshold that would result in the tube bursting or otherwise failing. Further, it is necessary to accomplish this while also ensuring the tube sufficiently expands to provide a tight fit (i.e., frictionally attached) with the internal diameter of holes in the fins.

SUMMARY

These and other problems are be addressed by the technologies described herein. Examples of the present disclosure relate generally to methods for heat exchanger manufacturing and, more specifically, to methods for pressure expanding a tube to fit a heat exchanger fin.

The disclosed technology includes a method for expanding a tube for manufacturing a heat exchanger that includes fluidly connecting a pressurizing device to the tube and providing, by the pressurizing device, pulses of positive pressure to an interior of the tube. each of the pulses can have a duration that is less than or approximately equal to 200 milliseconds, and at least one of the pulses can provide a pressure that is greater than or approximately equal to a maximum pressure threshold of the tube. The pulses can cause a diameter of a wall of the tube to increase.

The method can be simultaneously performed on multiple tubes.

At least some of the pulses can have a duration that is less than or approximately equal to 100 milliseconds.

The maximum pressure threshold can be associated with failure of the tube.

The maximum pressure threshold can be less than or equal to approximately 3000 psig.

The method can include creating a temperature differential between straight sections of the tube and a bend section of the tube such that the bend section has a temperature that is less than a temperature of the straight sections.

Creating the temperature differential between the straight sections and the bend section can include heating the straight sections.

Creating the temperature differential between the straight sections and the bend section can include cooling the bend section.

The method can include creating an external pressure differential between straight sections of the tube and a bend section of the tube such that the bend section experiences an external pressure that is greater than an external pressure experienced by the straight sections.

Creating the external pressure differential between the straight sections and the bend section can include (i) substantially enveloping the bend section with a pressurizing device such that at least part of the bend section is located in a cavity of the pressurizing device and (ii) pressurizing the cavity of the pressurizing device, thereby increasing the external pressure experienced by the at least part of the bend section.

Creating the external pressure differential between the straight sections and the bend section can include (i) substantially enveloping the straight sections with a depressurizing device such that at least part of each of the straight sections is located in a cavity of the pressurizing device and (ii) creating a negative pressure in the cavity of the depressurizing device, thereby decreasing the external pressure experienced by the at least part of each of the straight sections.

The disclosed technology includes a method for expanding a tube for manufacturing a heat exchanger that includes creating an external pressure differential between straight sections of the tube and a bend section of the tube such that the bend section experiences an external pressure that is greater than an external pressure experienced by the straight sections. The method can include fluidly connecting a pressurizing device to the tube and providing, by the pressurizing device, a positive pressure to an interior of the tube, thereby causing a diameter of a wall of the tube to increase.

Creating the external pressure differential between the straight sections and the bend section can include (i) substantially enveloping the bend section with a pressurizing device such that at least part of the bend section is located in a cavity of the pressurizing device and (ii) pressurizing the cavity of the pressurizing device thereby increasing the external pressure experienced by the at least part of the bend section.

Creating the external pressure differential between the straight sections and the bend section can include (i) substantially enveloping the straight sections with a depressurizing device such that at least part of each of the straight sections is located in a cavity of the pressurizing device and (ii) creating a negative pressure in the cavity of the depressurizing device thereby decreasing the external pressure experienced by the at least part of each of the straight sections.

Providing the positive pressure to the interior of the tube can include providing pulses of positive pressure to an interior of the tube. Each of the pulses can have a duration that is less than or approximately equal to 200 milliseconds, and at least one of the pulses providing a pressure that is greater than or approximately equal to a maximum pressure threshold of the tube.

The method can include creating a temperature differential between the straight sections and the bend section such that the bend section has a temperature that is less than a temperature of the straight sections.

Creating the temperature differential between the straight sections and the bend section can include heating the straight sections.

Creating the temperature differential between the straight sections and the bend section can include cooling the bend section.

The disclosed technology includes a method for expanding a tube for manufacturing a heat exchanger that includes creating a temperature differential between straight sections of the tube and a bend section of the tube such that the bend section has a temperature that is less than a temperature of the straight sections. The method can include fluidly connecting a pressurizing device to the tube and providing, by the pressurizing device, a positive pressure to an interior of the tube, thereby causing a diameter of a wall of the tube to increase.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings.

DETAILED DESCRIPTION

Figure 1A:
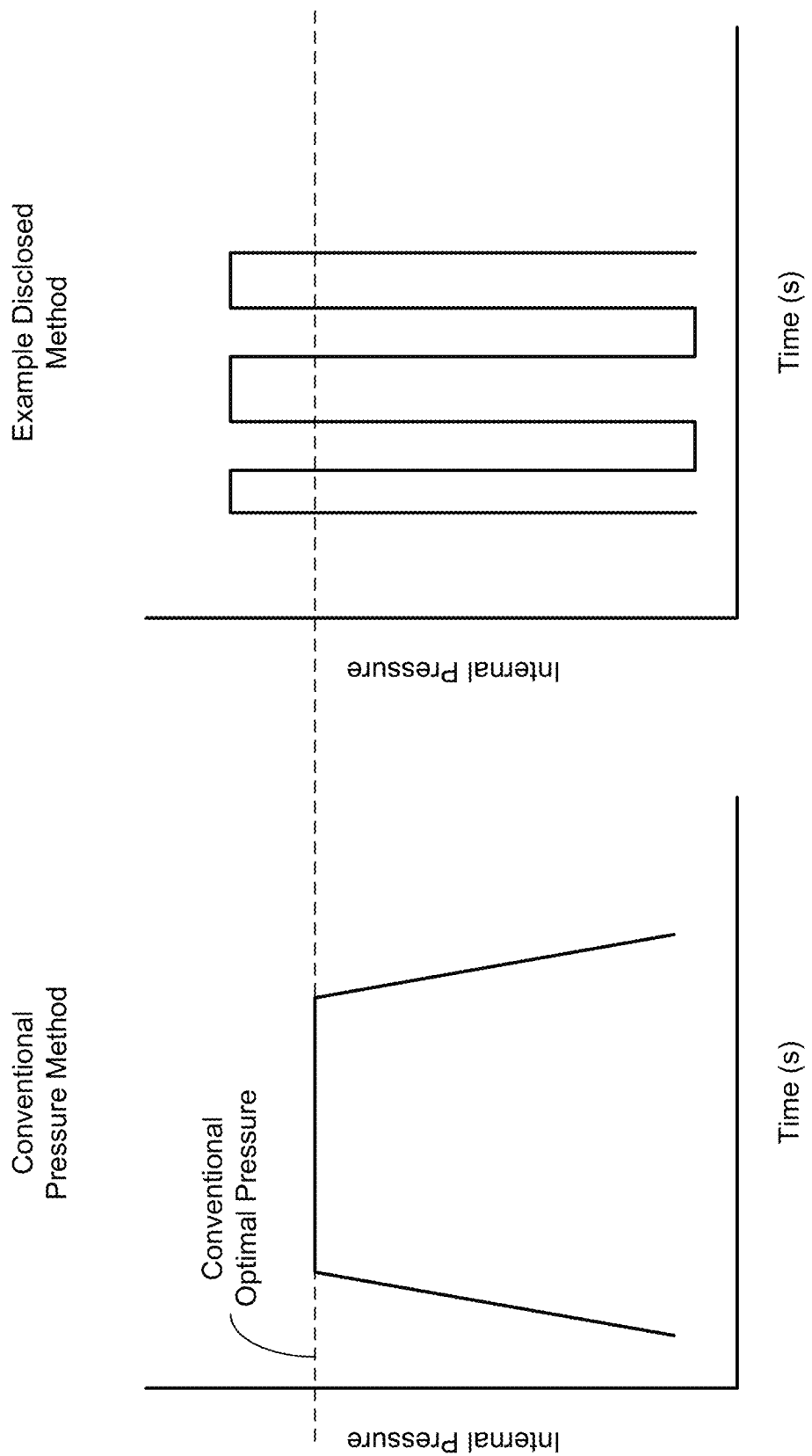
FIGS. 1A and 1B each illustrate a comparison of graphs representing pressure provided by conventional methods for expanding the diameter of a tube and an example method for expanding the diameter of a tube in accordance with the disclosed technology.

Throughout this disclosure, systems and methods are described with respect to pressure expanding a tube to fit a heat exchanger fin. Those having skill in the art will recognize that the disclosed technology can be applicable to multiple scenarios and applications.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, the phrases "expanding a tube," "causing a wall of the tube to expand," and the like refer to moving the walls of a tube radially outward such that the diameter of the tube increases.

Although the disclosed technology may be described herein with respect to various systems and methods, it is contemplated that embodiments or implementations of the disclosed technology with identical or substantially similar features may alternatively be implemented as methods or systems. For example, any aspects, elements, features, or the like described herein with respect to a method can be equally attributable to a system. As another example, any aspects, elements, features, or the like described herein with respect to a system can be equally attributable to a method.

Reference will now be made in detail to example embodiments of the disclosed technology, examples of which are illustrated in the accompanying drawings and disclosed herein. Wherever convenient, the same reference numbers will be used throughout the drawings to refer to the same or like parts.

Existing processes for expanding tubes for heat exchanger manufacturing using pressure expansion typically provide pressure to the interior of the tube (also referred to herein as "internal pressure") at a constant pressure. A typical conventional process can include building internal pressure within the tube to a target pressure, maintaining that pressure for a predetermined duration, and then decreasing the internal pressure. The target pressure of conventional processes can correspond to a range of pressure values that is above the yield point (e.g., yield threshold) of the tube material (i.e., causing the tube material to become plastic and/or deformable) and below a failure point or rupture point (e.g., failure threshold) of the tube material. The range of pressure values between the yield point and the failure point can be small, which makes it difficult to provide and maintain a target pressure value within that range. As an example, a conventional process for a commonly used aluminum alloy can include building the internal pressure to a target pressure value (referred to herein as a "conventional target pressure") that is in a range from approximately 2700 psig to approximately 2740 psig (e.g., over a ramp-up period that is in the range of approximately 0.5 seconds to approximately 1 second), holding that internal pressure for a predetermined duration (e.g., 2 seconds, 3 seconds, 4 seconds), and the decreasing the internal pressure (e.g., over a ramp-down period). As will be appreciated, the conventional target pressure can vary (e.g., depending on the material of the tubes, depending on the size and/or geometry of the tubes). As additional examples of conventional target pressures, certain commonly used metals (e.g., aluminum alloys) are currently expanded using a maximum internal pressure in the range from approximately 2400 psig to approximately 2500 psig, in the range from approximately 2500 psig to approximately 2600 psig, in the range from approximately 2600 psig to approximately 2700 psig, in the range from approximately 2700 psig to approximately 2800 psig, in the range from approximately 2800 psig to approximately 2900 psig, in the range from approximately 2900 psig to approximately 3000 psig, in the range from approximately 3000 psig to approximately 3100 psig, and in the range from approximately 3100 psig to approximately 3200 psig.

The disclosed technology includes a process for expanding tubes for heat exchanger manufacturing by providing brief pulses of internal pressure to the tubes. The pulses can be of a high pressure (e.g., equal to the conventional target pressure, higher than the conventional target pressure value) and of a short duration, such that the pulses can provide a sequence of pressure-inflicted impacts to the internal surface of the tube's wall, thereby causing the wall of the tube to expand and create a tight fit or an interference fit with the fins.

Figure 2A:
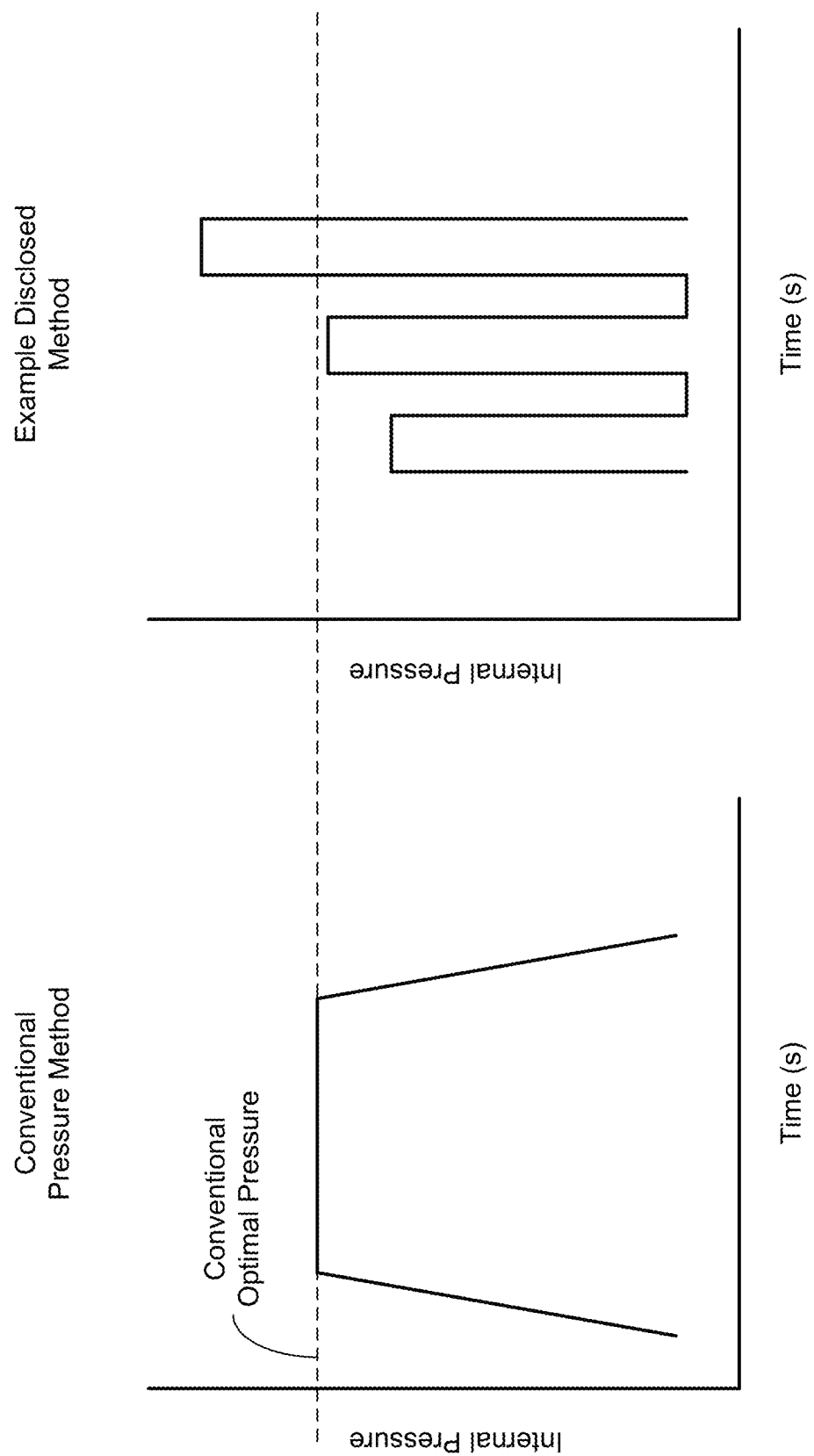
FIGS. 2A and 2B each illustrate a comparison of graphs representing pressure provided by conventional methods for expanding the diameter of a tube and an example method for expanding the diameter of a tube in accordance with the disclosed technology.

As depicted in FIGS. 1A and 2A, one or more of the pulses can have a pressure that is greater than the conventional target pressure value. Each of the pulses can have approximately the same pressure value, such as is shown in FIG. 1A. Alternatively, the pulses can progressively increase in pressure, such as is shown in FIG. 2A. The amount of increase in pressure between pulses can be constant. Alternatively, sequential pulses can increase by different amounts of pressure. For example, a first pulse can have a pressure of approximately 2700 psig, a second pulse can have a pressure of approximately 2800 psig, and a third pulse can have a pressure of approximately 3000 psig.

Figure 1B:
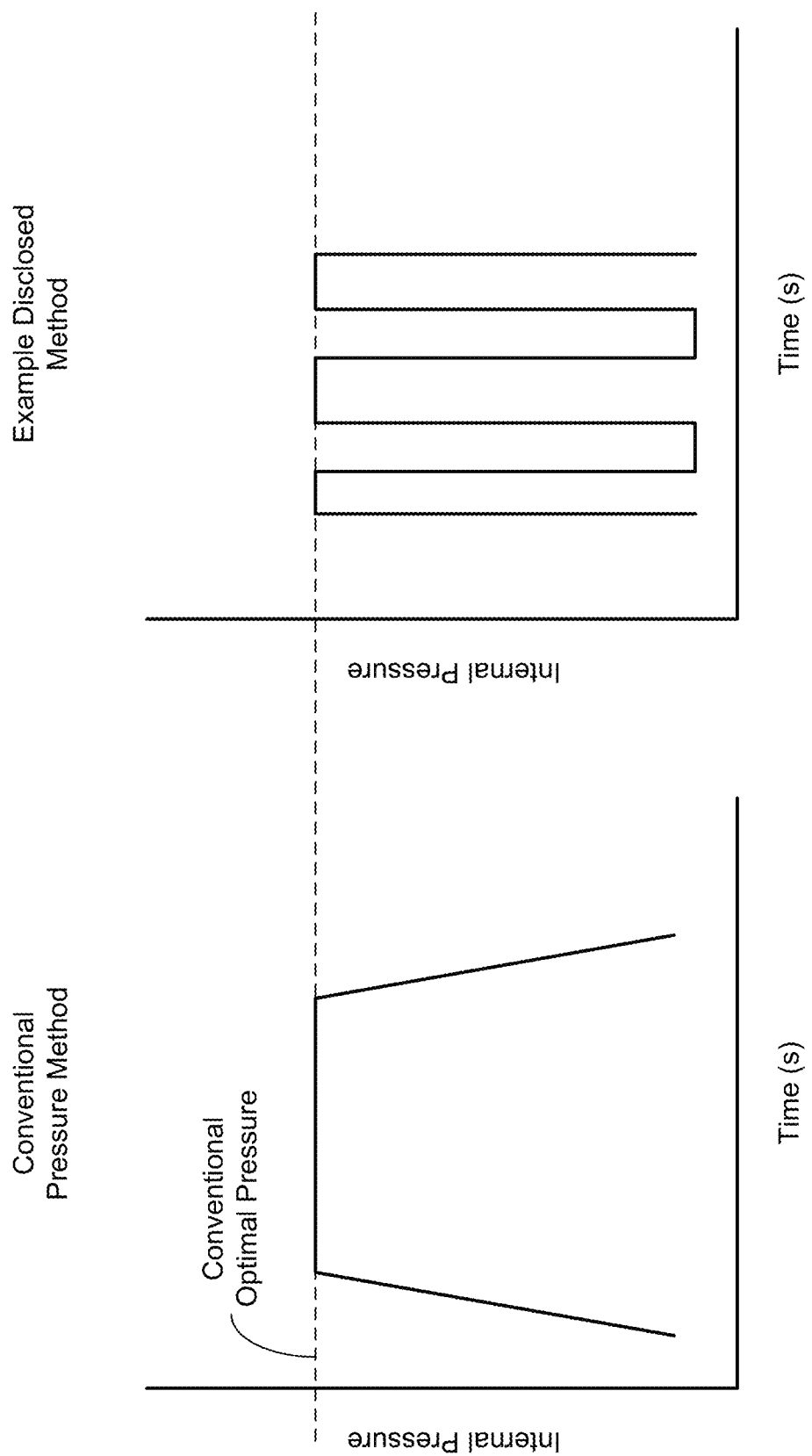
Figure 2B:
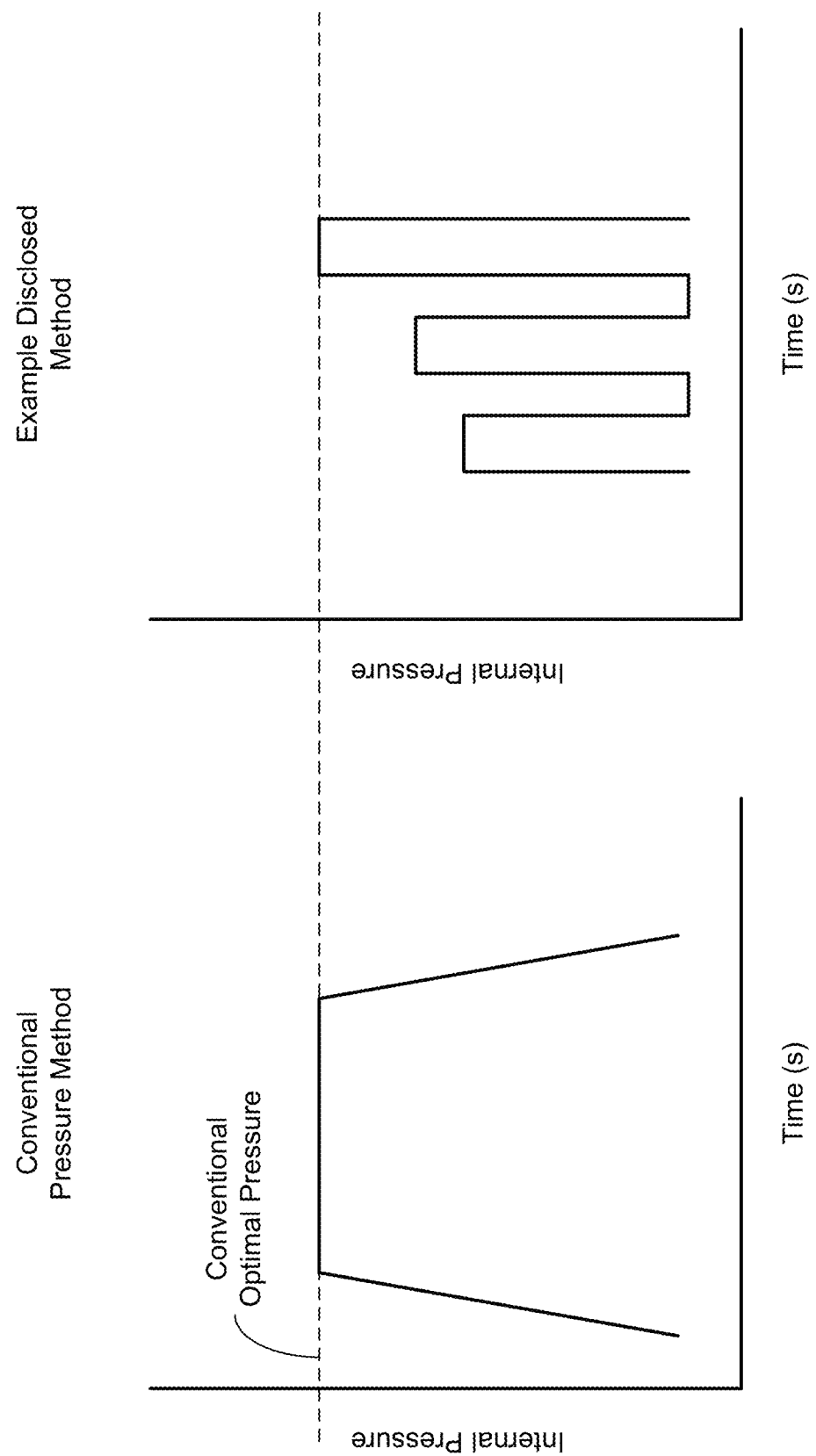

While one or more of the pulses can exceed the conventional target pressure value, the disclosed technology also includes the application of pulses that are approximately equal to or less than the conventional target pressure value. For example, FIGS. 1B and 2B illustrate pulses having pressures that are equal to or less than the conventional target pressure value. Each of the pulses can have approximately the same pressure value, such as is shown in FIG. 1B. Alternatively, the pulses can progressively increase in pressure, such as is shown in FIG. 2B. The amount of increase in pressure between pulses can be constant. Alternatively, sequential pulses can increase by different amounts of pressure.

Some or all of the pulses can be at a pressure that is less than the conventional target pressure (e.g., less than approximately 2700 psig). Some or all of the pulses can be at a pressure that is approximately equal to the conventional target pressure value (e.g., one or more pressure values in the range from approximately 2700 psig to approximately 2740 psig). Some or all of the pulses can be at a pressure that is greater than the conventional target pressure value. For example, some or all of the pulses can be in the range from approximately 2740 psig to approximately 3000 psig. As another example, some or all of the pulses can be greater than 3000 psig (e.g., 3050 psig, 3100 psig).

Each pulse can be of a sufficiently short duration that any risk of rupturing the tube is decreased and/or minimized. For example each pulse can have a duration that is approximately 100 milliseconds or less. As another example, each pulse can have a duration that is approximately 200 milliseconds or less. As yet another example, each pulse can have a duration that is approximately 50 milliseconds or less. That is, the pulses can have a duration that is in the range from approximately 1 millisecond to approximately 50 milliseconds.

Between each pulse, there can be a pause period in which no additional interior pressure is provided or a reduced amount of interior pressure is provided. The pause period can be approximately constant between pulses, or the pause period can change. The pause period can be in a range from approximately 50 milliseconds to approximately 200 milliseconds, for example. As another example, the pause period can be in a range from approximately 1 millisecond to approximately 50 milliseconds. The pause period and the pulse duration can combine to define a pulse frequency. The pulse frequency can be related to the pressure of the pulses. In some instances, the pulse frequency can be a function of the pressure of the pulses. For example, the pulse frequency can in direct correlation to the pressure of the pulses. That is, as the pressure of the pulses increases, the frequency of the pulses can also increase (i.e., the pulse duration can decrease).

The method can include providing any number of pulses. For example, the method can include providing two pulses of pressurized fluid. As another example, the method can include providing three, four, five, ten, twenty, fifty, 100, or more pulses. As will be understood, the appropriate number and/or duration of pulses can depend on the characteristics of a given tube and/or heat exchanger configuration.

The yield point of the tube material can be altered by adjusting the temperature of the tube. And because the bend (e.g., U-bend, hairpin bend) of the tube is the most likely part of the tube to rupture or otherwise fail, it can be helpful to create a temperature differential between the straight sections of the tube and the bend section of the tube. To achieve this temperature differential, the straight sections of the tube can be heated. Alternatively or additionally, the bend section of the tube can be cooled. In either case, the heat or cooling effect can be applied to the corresponding outer surface of the tube. For example, the straight sections of the tube can be heated by applying to at least a portion of the straight sections a material or combination or materials providing an exothermic reaction, applying a warming blanket to at least a portion of the straight sections, bringing a heating element into contact with at least a portion of the straight sections, causing heated air to run across at least a portion of the straight sections, and/or submerge at least a portion of the straight sections in heated liquid. As another example, the cooling effect can be provided to the bend section by applying to at least a portion of the bend section a material or combination or materials providing an endothermic reaction, applying a heat sink or similar device to at least a portion of the bend section, causing cooled air to run across at least a portion of the bend section, and/or submerge at least a portion of the bend section in cooled liquid.

As will be appreciated, by creating a temperature differential between the straight sections and the bend section where the bend section has a lower temperature than the straight sections, it is possible to cause the bend section to have a higher yield point than normal and/or cause the straight sections to have a lower yield point than normal. Accordingly, it can be easier to expand the straight sections of the tube while also decreasing the risk of rupturing or otherwise damaging the bend.

Alternatively or additionally, it can be helpful to reduce the hoop stress experienced by the bend section. During the pressure expansion process, the tube experiences hoop stresses throughout the straight sections and the bend section. As explained above, the purpose of the pressure expansion process is to expand the straight sections to create an interference fit between the exterior surface of the respective straight sections and the interior surface of a hole in corresponding fins. Due at least in part to its differing geometry and/or differing wall thickness (as compared to the straight sections), the bend section typically fails or ruptures before the straight sections. That is, the bend section typically fails or ruptures at a lower hoop stress than the straight sections.

Hoop stress is a function of the force exerted on the wall of the tube and can thus be modified by adjusting the pressure differential between the interior and exterior portions of the tube. For example, an external pressure can be provided at the bend section. This can result in a lower gauge pressure experienced at the bend section as compared to the gauge pressure experienced at the straight sections, thereby lowering the hoop stress experienced at the bend section as compared to the hoop stress experienced at the straight sections.

Figure 3A:
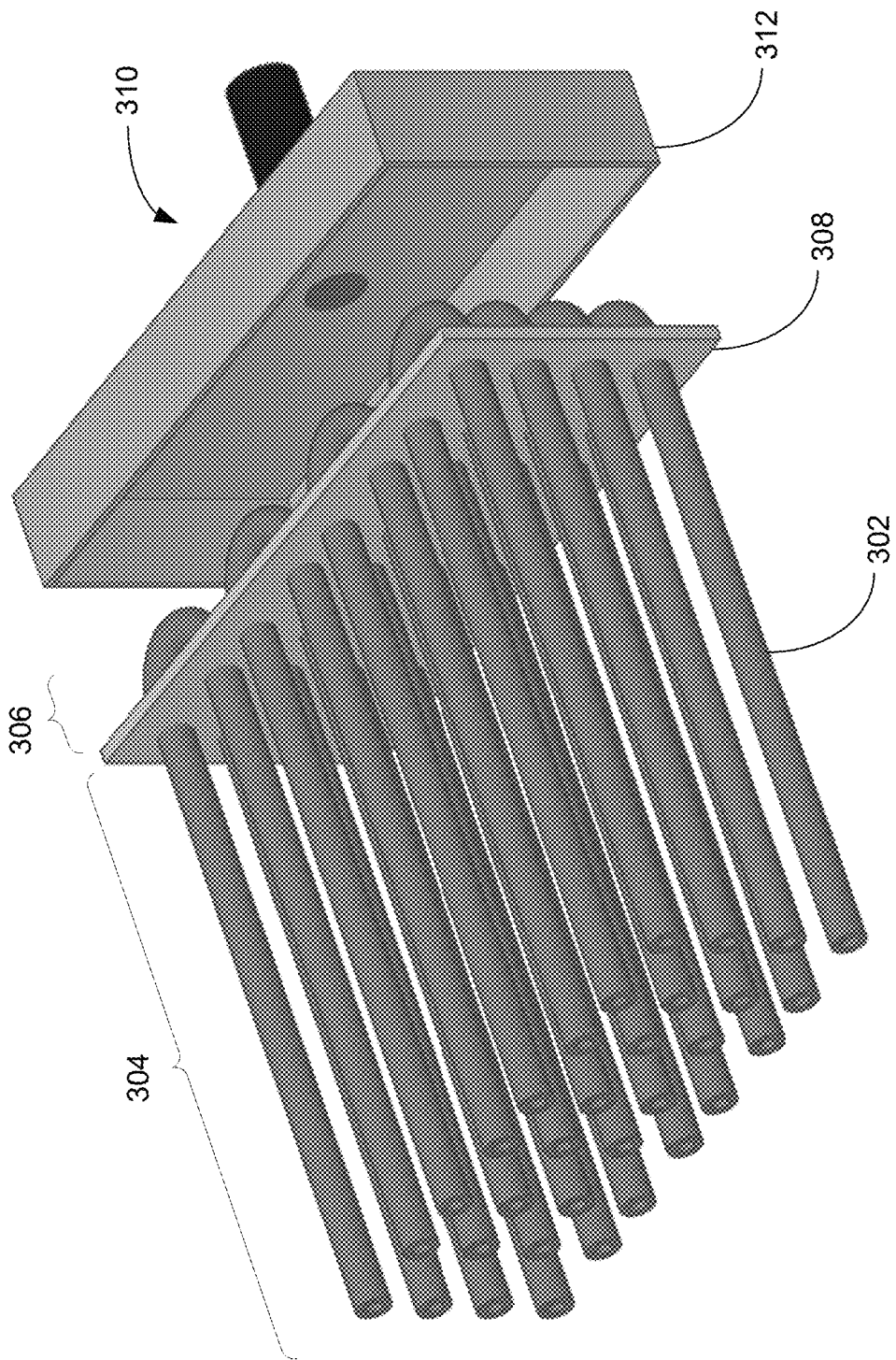
FIGS. 3A and 3B illustrate an example pressurizing device for providing an increased external pressure to bends of tubes, in accordance with the disclosed technology.
Figure 3B:
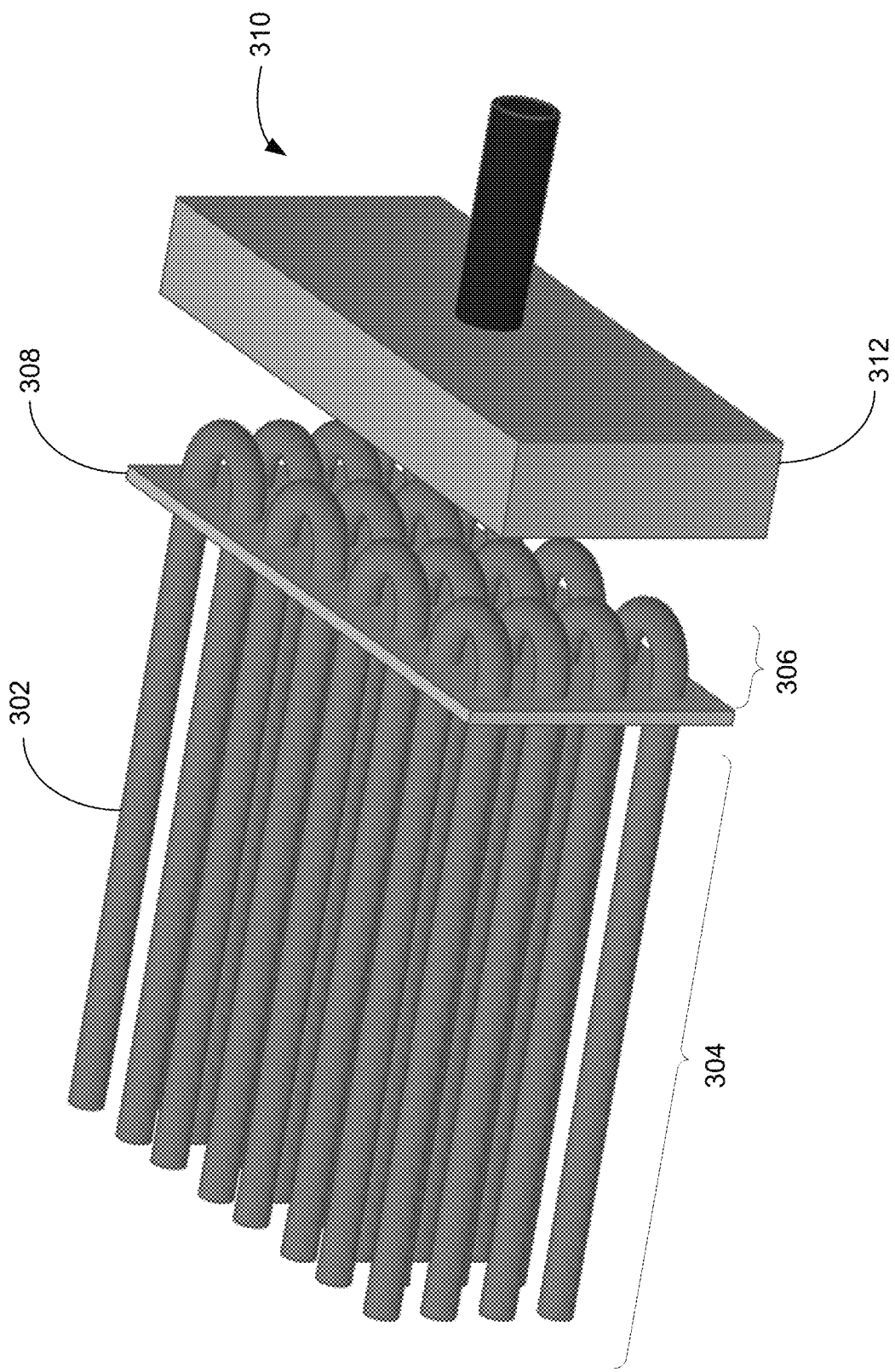

Accordingly, the disclosed method can include providing an external pressure to the bend section of the tubes. Referring to FIGS. 3A and 3B, the tubes 302 of a heat exchanger can extend through a tube sheet 308 such that the straight sections 304 of each tube 302 are separated from the bend section 306 of each tube 302 by the tube sheet 308. A pressurizing device 310 can be pressed against the tube sheet 308. The pressurizing device 310 can include a housing 312 configured to envelop the bend section 306 of one or more tubes 302. The pressurizing device 310 can provide exterior pressure to the bend section via any fluid, whether gaseous or liquidous. The exterior of the straight sections 304 can experience ambient air pressure, for example. Alternatively or additionally, the straight sections 304 can be placed in a negative pressure environment (e.g., a vacuum, a partial vacuum). Regardless, the disclosed technology includes adjusting the external pressure experienced by the straight sections 304 and/or the external pressure experienced by the bend section 306 such that the bend section 306 experiences an external pressure that is greater than the external pressure experienced by the straight sections 304.

The edge of the housing can optionally include a sealing material to help form a seal between the tube sheet 308 and the housing 312 of the pressurizing device 310. The sealing material can include, but is not limited to, EPDM rubber, a thermoplastic elastomer (TPE) mix of plastic and rubber, a thermoplastic olefin (TPO) polymer/filler blend silicone, and the like. Once the housing 312 is pressed against the tube sheet 308, the pressurizing device 310 can increase the pressure within the housing 312, thereby increasing the external pressure on the bend section 306 of each tube 302.

The housing 312 can be sealed or substantially sealed to the tube sheet 308 with a clamp (e.g., clamping the tube sheet 308 to the housing 312, clamping the housing about a surface, an edge, or a perimeter of the tube sheet 308), which can help prevent leakage from between the housing 312 and the tube sheet 308. That said, even if there is a minor leak, a sufficient pressure differential can be achieved every if the pressure inside the housing 310 is relatively low. That is, the pressure providing inside the housing 310 need only be high enough to provide a differential pressure between the straight sections 304 and the bend section 306. For example, while the pressure inside the tubes 302 can be on the scale of 2700 psig, whereas the pressure inside the housing 310 can be on the scale of 100 psig, 50 psig, or 25 psig.

Although not shown in FIGS. 3A and 3B, the fins can each include a hole, and a straight section 304 of a corresponding tube 302 can be fed through each hole such that a number of fins are arranged on the straight sections 304 of the tubes 302. External pressure can then be provided via the pressurizing device 310 to the bend sections 304, and internal pressure can be provided to the tubes 302 (i.e., the interior of the straight sections 304 and the interior of the bend section 306).

When providing external pressure to the bend sections, the application of internal pressure can be conducted according to known techniques. That is, the internal pressure can be a pressure value that is above the yield point or yield threshold of the tube material and below the pressure threshold associated with rupture or other failure, and the internal pressure can be applied at a constant pressure for a predetermined duration, such as two seconds.

Alternatively, the application of internal pressure can be conducted according to the various methods described herein. For example, external pressure can be applied to the bend section of the tubes, and internal pressure can be applied to the tubes by providing multiple, brief (e.g., a duration of 100 milliseconds) pulses of high pressure (e.g., greater than the conventional target threshold, greater than the conventional pressure threshold associated with rupture or failure).

Figure 4:
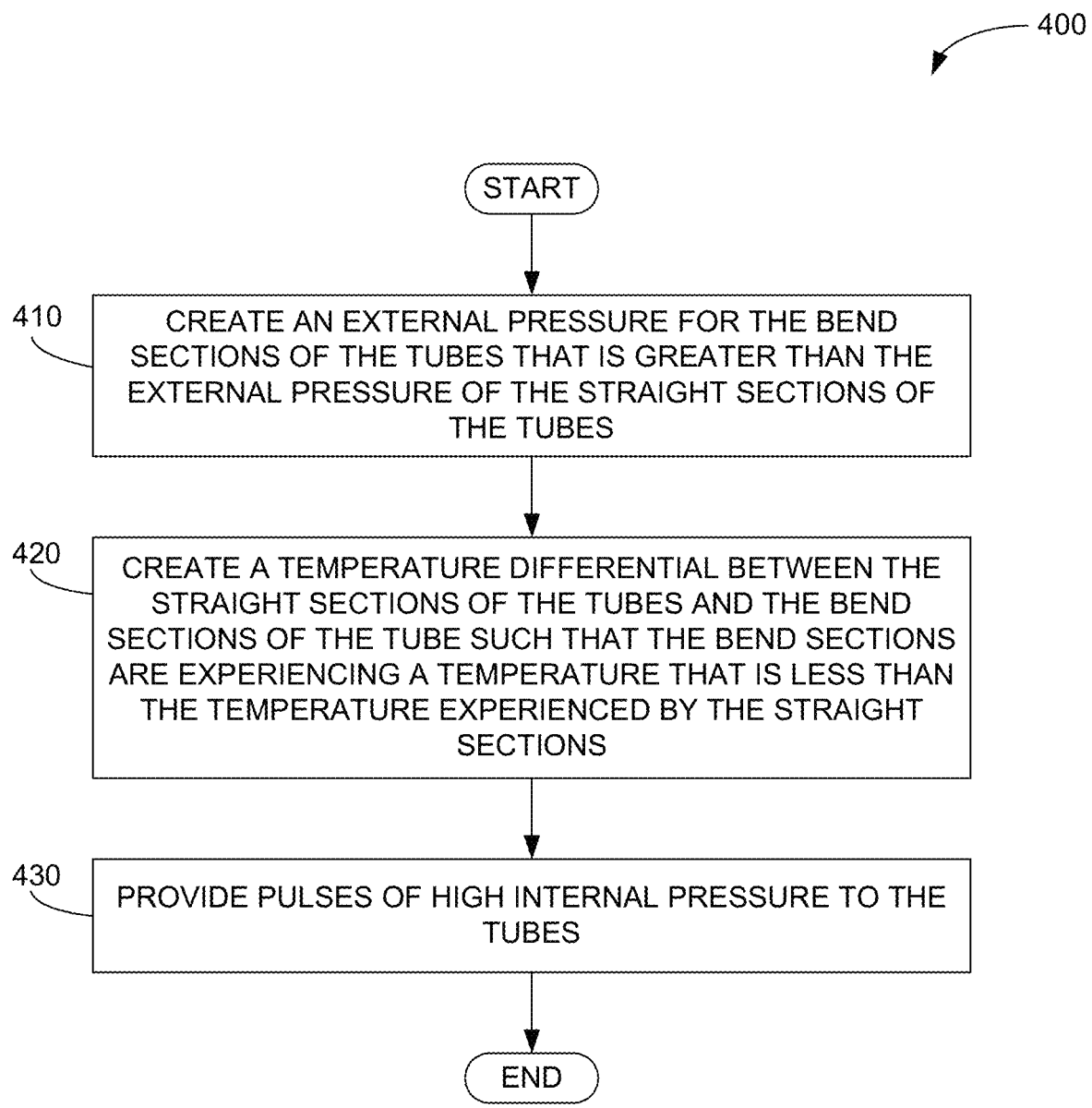
FIG. 4 illustrates a flowchart of an example method for expanding the diameter of a tube for heat exchanger manufacturing, in accordance with the disclosed technology.

Referring now to FIG. 4, the disclosed technology includes a method 400 for heat exchanger manufacturing, particularly as it relates to expanding a tube to create a tight fit or an interference fit with one or more fins. The method 400 can include creating 410 an external pressure for the bend section of the tube that is greater than the external pressure of the straight sections of the tube. As disclosed herein, creating an external pressure difference between the bend section and the straight sections can include providing an elevated external pressure at the bend section of the tubes and/or providing a decreased external pressure at the straight sections of the tubes. For example, a housing (e.g., housing 412) of a pressurizing device (e.g., pressurizing device 410) can be pressed against a tube sheet having tubes extending therethrough. The housing can be installed such that the bend sections of the tubes are substantially enveloped by the housing and the tube sheet. The pressuring device can create an increased pressure within the housing such that the bend sections experience an increased external pressure. Alternatively or additionally, a housing of a depressurizing device can be pressed against the opposite side of the tube sheet such that the straight sections of the tubes are substantially enveloped by the housing and the tube sheet. The depressurizing device can create a decreased pressure (e.g., vacuum, partial vacuum) within the housing such that the straight sections experienced a decreased external pressure. Tubing or another connection components can extend into the cavity of the housing of the depressurizing device, which can permit the simultaneous application of a decreased external pressure to the straight sections and an internal pressure to the tubes. Alternatively, the housing of the depressurizing device can include apertures through which the ends of the straight sections can extend, thereby permitting connection of the tubes to a pressurizing device configured to provide internal pressure to the tubes. The apertures of the housing can be configured to form a seal or a partial seal with the tubes.

The method 400 can include creating 420 a temperature differential between the straight sections of the tubes and the bend sections of the tubes such that the bend sections are experiencing a temperature that is less than the temperature experienced by the straight sections. The temperature differential can be provided according to any of the methods or techniques described herein. For example, the temperature of the straight sections can be increased (e.g., by a heating element) and/or the temperature of the bend sections can be decreased (e.g., by running cooled air across the exterior of the bend sections).

The method 400 can include providing 430 multiple pulses of high internal pressure to the tubes. High internal pressure can refer to pressure values that are above conventional target pressure values for expanding the straight sections of the tubes. The conventional target pressure values can be pressure values that are above a yield point of the material and below a failure point of the tubes. The failure point of the tubes can be dependent on the material of the tubes, the wall thickness of the tubes, and/or the geometry of the tubes. As an example, a high internal pressure can be pressure values that are above the failure point of the tubes. As a more specific example, for a U-bend tube for which the conventional target internal pressure is in the range from approximately 2700 psig to 2740 psig, the method 400 can include providing 430 multiple pulses of internal pressure that is greater than or equal to approximately 2800 psig. Under the same circumstances, the method 400 can include providing 430 multiple pulses of internal pressure that is greater than or equal to approximately 2900 psig. Under the same circumstances, the method 400 can include providing 430 multiple pulses of internal pressure that is greater than or equal to approximately 3000 psig. To provide 430 the pulses of high internal pressure, the method can include attaching a hose, nozzle, or other component in fluid communication with a pressurizing device to one or both ends of the tube and introducing a pressurized fluid into the interior of the tube. The fluid can be gaseous or liquidous. The pulses of pressure can be provided according to any of the methods and techniques described herein. The pulses of pressure can be provided such that the walls of the straight sections are expanded, thereby creating a tight fit or an interference fit between an exterior surface of the straight sections and an interior surface of holes in fins.

As will be appreciated, the disclosed technology can include a method comprising one or more of the disclosed processes or methodologies. For example, the method 400 includes creating 410 an external pressure for the bend section of the tube that is greater than the external pressure of the straight sections of the tube, creating 420 a temperature differential between the straight sections of the tubes and the bend sections of the tubes such that the bend sections are experiencing a temperature that is less than the temperature experienced by the straight sections, and providing 430 multiple pulses of high internal pressure to the tubes. The disclosed technology includes a method comprising any one of these processes and also includes methods comprising any combi-nation of these processes.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "one example," "an example," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Further, certain methods and processes are described herein. It is contemplated that the disclosed methods and processes can include, but do not necessarily include, all steps discussed herein. That is, methods and processes in accordance with the disclosed technology can include some of the disclosed while omitting others. Moreover, methods and processes in accordance with the disclosed technology can include other steps not expressly described herein.

Throughout the specification and the claims, the following terms take at least the meanings explicitly associated herein, unless otherwise indicated. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

Further, while certain values and ranges of values have been described herein, it is to be understood that the amount of pressure required to expand a given tube can depend on several variables, which can include, but are not limited to, the material composition of the tube (e.g., aluminum alloy, copper), the size of the tube (e.g., diameter, wall thickness), the geometry of the tube, and/or the fin density (e.g., the number of fins per unit length of the tube). Thus, the various values and/or ranges of values expressly described herein can altered by variations to one or more of these or other variables.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for expanding a tube for manufacturing a heat exchanger, the method comprising:
   fluidly connecting a pressurizing device to the tube;
   providing, by the pressurizing device, pulses of positive pressure to an interior of the tube, each of the pulses having a duration that is less than or approximately equal to 200 milliseconds and at least one of the pulses providing a pressure that is greater than or approximately equal to a maximum pressure threshold of the tube, the pulses causing a diameter of a wall of the tube to increase; and creating a temperature differential between straight sections of the tube and a bend section of the tube such that the bend section has a temperature that is less than a temperature of the straight sections.

2. The method of claim 1, wherein at least some of the pulses have a duration that is less than or approximately equal to 100 milliseconds.

3. The method of claim 1, wherein the maximum pressure threshold is associated with failure of the tube.

4. The method of claim 1, wherein the maximum pressure threshold is less than or equal to approximately 3000 psig.

5. The method of claim 1, wherein creating the temperature differential between the straight sections and the bend section comprises heating the straight sections.

6. The method of claim 1, wherein creating the temperature differential between the straight sections and the bend section comprises cooling the bend section.

7. The method of claim 1 further comprising:
creating an external pressure differential between straight sections of the tube and a bend section of the tube such that the bend section experiences an external pressure that is greater than an external pressure experienced by the straight sections.

8. The method of claim 7, wherein creating the external pressure differential between the straight sections and the bend section comprises:
substantially enveloping the bend section with a pressurizing device such that at least part of the bend section is located in a cavity of the pressurizing device; and
pressurizing the cavity of the pressurizing device thereby increasing the external pressure experienced by the at least part of the bend section.

9. The method of claim 7, wherein creating the external pressure differential between the straight sections and the bend section comprises:
substantially enveloping the straight sections with a depressurizing device such that at least part of each of the straight sections is located in a cavity of the pressurizing device; and
creating a negative pressure in the cavity of the depressurizing device thereby decreasing the external pressure experienced by the at least part of each of the straight sections.

10. A method for expanding a tube for manufacturing a heat exchanger, the method comprising:
creating an external pressure differential between straight sections of the tube and a bend section of the tube such that the bend section experiences an external pressure that is greater than an external pressure experienced by the straight sections;
fluidly connecting a pressurizing device to the tube; and
providing, by the pressurizing device, a positive pressure to an interior of the tube thereby causing a diameter of a wall of the tube to increase.

11. The method of claim 10, wherein creating the external pressure differential between the straight sections and the bend section comprises:
substantially enveloping the bend section with a pressurizing device such that at least part of the bend section is located in a cavity of the pressurizing device; and
pressurizing the cavity of the pressurizing device thereby increasing the external pressure experienced by the at least part of the bend section.

12. The method of claim 10, wherein creating the external pressure differential between the straight sections and the bend section comprises:
substantially enveloping the straight sections with a depressurizing device such that at least part of each of the straight sections is located in a cavity of the pressurizing device; and
creating a negative pressure in the cavity of the depressurizing device thereby decreasing the external pressure experienced by the at least part of each of the straight sections.

13. The method of claim 10, wherein providing the positive pressure to the interior of the tube comprises:
providing pulses of positive pressure to an interior of the tube, each of the pulses having a duration that is less than or approximately equal to 200 milliseconds and at least one of the pulses providing a pressure that is greater than or approximately equal to a maximum pressure threshold of the tube.

14. The method of claim 10, wherein the maximum pressure threshold is associated with failure of the tube.

15. The method of claim 10, wherein the maximum pressure threshold is less than or equal to approximately 3000 psig.

16. The method of claim 10 further comprising:
creating a temperature differential between the straight sections and the bend section such that the bend section has a temperature that is less than a temperature of the straight sections.

17. The method of claim 16, wherein creating the temperature differential between the straight sections and the bend section comprises heating the straight sections.

18. The method of claim 16, wherein creating the temperature differential between the straight sections and the bend section comprises cooling the bend section.

19. A method for expanding a tube for manufacturing a heat exchanger, the method comprising:
creating a temperature differential between straight sections of the tube and a bend section of the tube such that the bend section has a temperature that is less than a temperature of the straight sections;
fluidly connecting a pressurizing device to the tube; and
providing, by the pressurizing device, a positive pressure to an interior of the tube thereby causing a diameter of a wall of the tube to increase.

* * * * *